(No Model.) 4 Sheets—Sheet 1.

W. H. CHAPMAN.
ELECTRIC MOTOR.

No. 428,454. Patented May 20, 1890.

Witnesses:
C. A. McClure
Walter E. Lombard

Inventor:
William H. Chapman,
by N. C. Lombard
Attorney.

(No Model.) 4 Sheets—Sheet 2.

W. H. CHAPMAN.
ELECTRIC MOTOR.

No. 428,454. Patented May 20, 1890.

Witnesses:
C. A. McClure
Walter E. Lombard

Inventor:
William H. Chapman,
by N. C. Lombard
Attorney.

(No Model.) 4 Sheets—Sheet 3.

W. H. CHAPMAN.
ELECTRIC MOTOR.

No. 428,454. Patented May 20, 1890.

Witnesses:
C. A. McClure
Walter E. Lombard.

Inventor:
William H. Chapman,
by N. C. Lombard
Attorney.

(No Model.) 4 Sheets—Sheet 4.

W. H. CHAPMAN.
ELECTRIC MOTOR.

No. 428,454. Patented May 20, 1890.

Witnesses:
C. A. McBlun
Walter E. Lombard

Inventor:
William H. Chapman,
by N. C. Lombard
Attorney.

UNITED STATES PATENT OFFICE.

WILLIAM H. CHAPMAN, OF PORTLAND, MAINE, ASSIGNOR TO THE GIANT ELECTRIC MOTOR COMPANY, OF BOSTON, MASSACHUSETTS.

ELECTRIC MOTOR.

SPECIFICATION forming part of Letters Patent No. 428,454, dated May 20, 1890.

Application filed December 30, 1889. Serial No. 335,307. (No model.)

*To all whom it may concern:*

Be it known that I, WILLIAM H. CHAPMAN, of Portland, in the county of Cumberland and State of Maine, have invented certain new and useful Improvements in Electric Motors, of which the following, taken in connection with the accompanying drawings, is a specification.

My present invention relates to electric motors of the multipolar type, by which is meant a motor provided with a field-magnet having a plurality of north poles and a plurality of south poles presented to the armature, and it is an improvement upon the invention described in Letters Patent No. 411,833, granted to Charles C. Peck, October 1, 1889.

My invention consists in certain novel features of construction, arrangement, and combination of parts, which will be readily understood by reference to the description of the drawings, and to the claims hereinafter given, and in which my invention is clearly pointed out.

Figure 7:
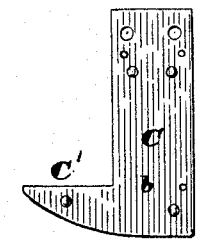
Figure 1:
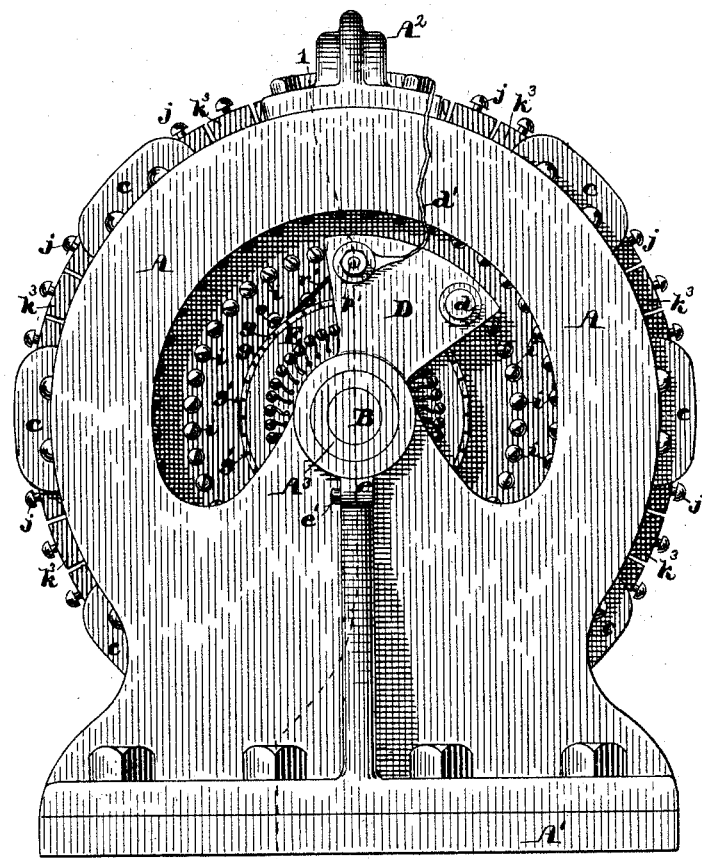
Figure 2:
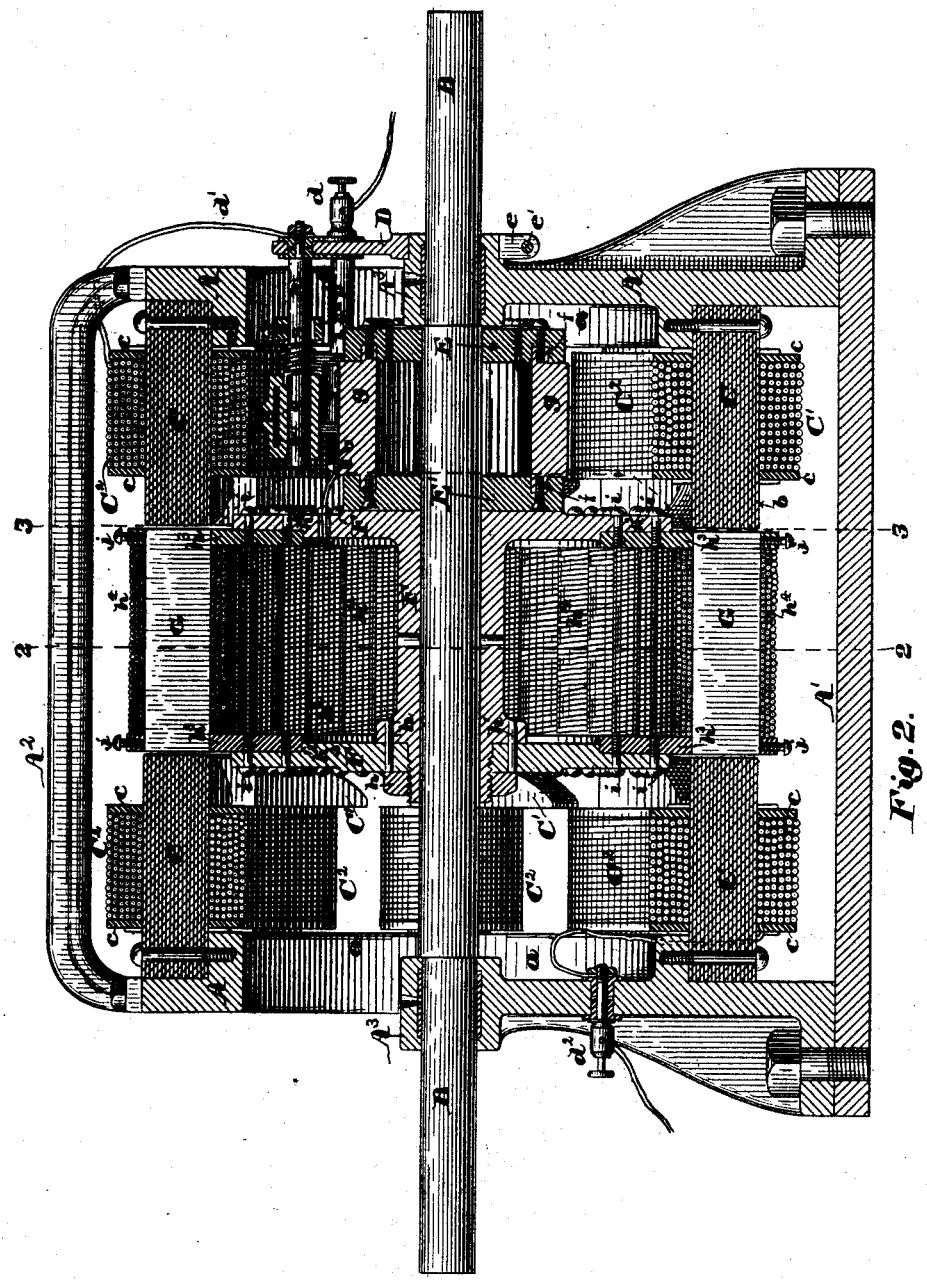
Figure 4:
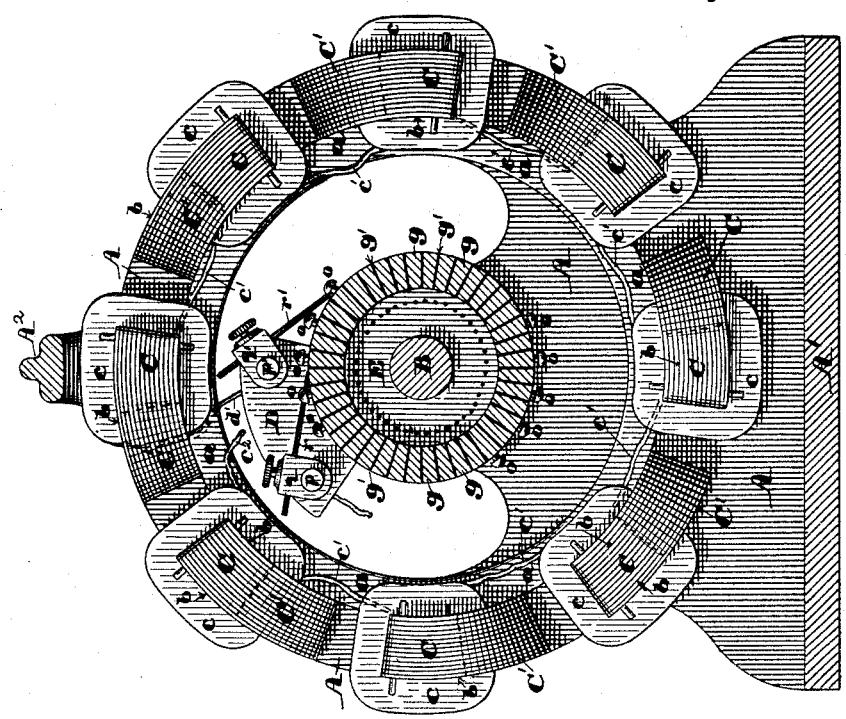
Figure 3:
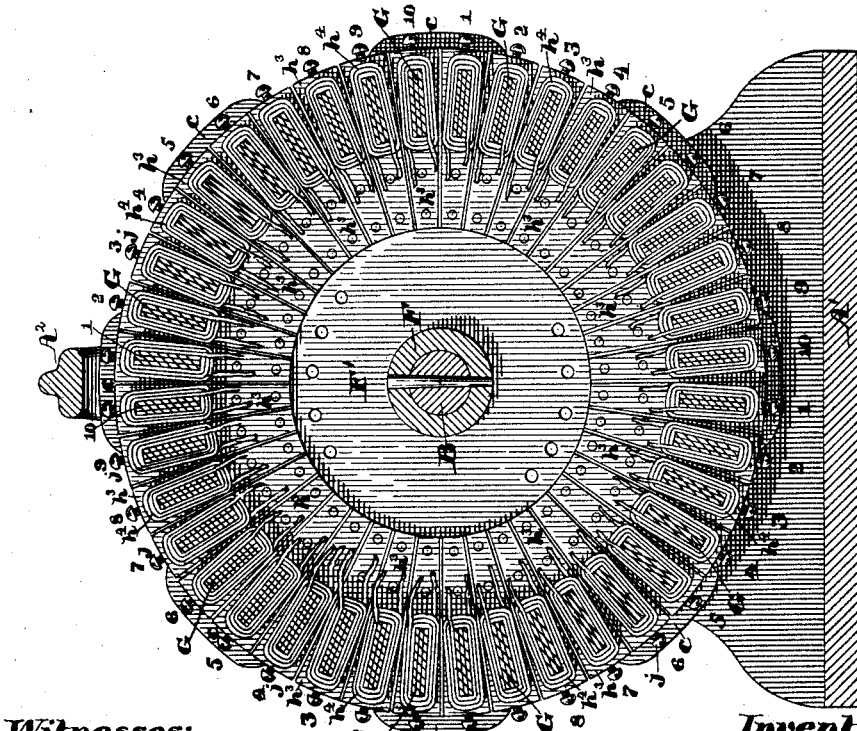
Figures 5, 6:
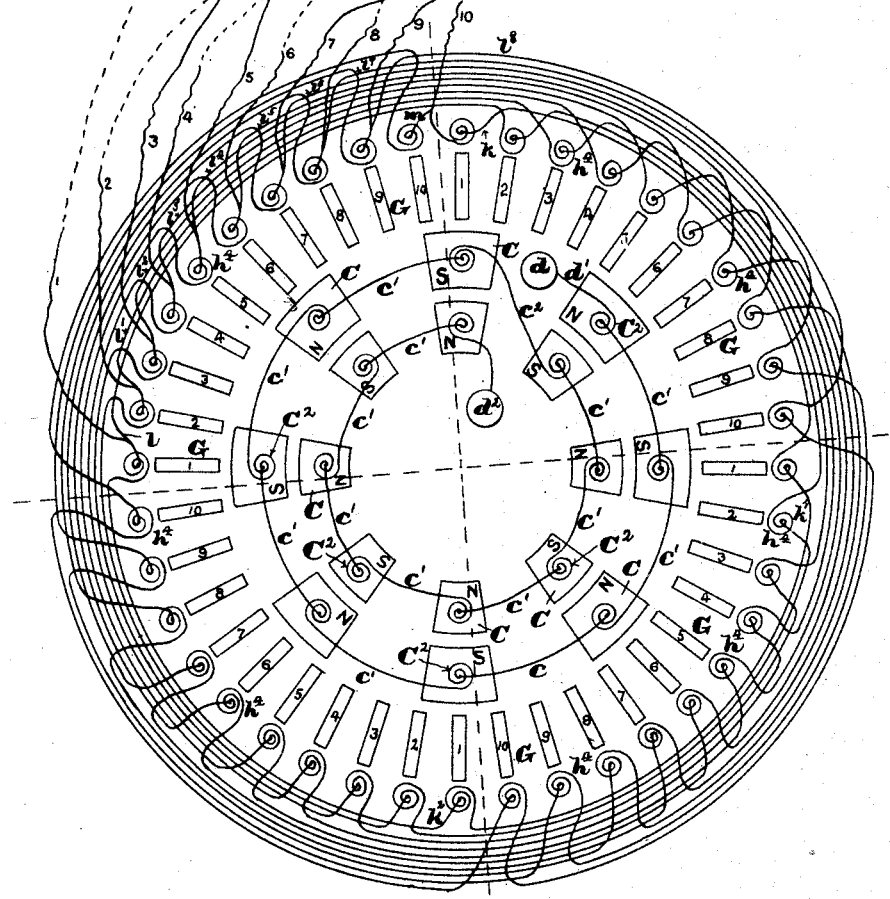

Figure 1 of the drawings is an end elevation of a motor embodying my invention. Fig. 2 is a vertical longitudinal section on line 1 1 on Fig. 1. Fig. 3 is a vertical transverse section on line 2 2 on Fig. 2. Fig. 4 is a vertical section on line 3 3 on Fig. 2 and looking toward the right of said Fig. 2. Fig. 5 is a diagram illustrating the manner of connecting the armature-magnets. Fig. 6 is a diagram illustrating the manner of connecting the segments of the commutator, the same being connected to Fig. 5 by dotted lines. Fig. 7 is a side elevation of one of the field-magnet pole-pieces.

In the drawings, A A are the end frames of the motor, which also serve as the yokes of the field-magnets, and are bolted to the base-plate A' at their bases and connected together at their tops by the tie-bar $A^2$, as clearly shown in Figs. 1 and 2. The frames or yokes A A each have formed therein a bearing $A^3$, in which is mounted the shaft B, and is also provided with the inwardly-projecting annular rib $a$, upon which are bolted the field-magnet cores C, each composed of a series of thin flat plates $b$, of soft iron, placed one upon the other and firmly secured together by rivets, and provided at its inner end with a laterally-projecting arm C', the working-face or inner surface of which is curved tangentially to a plane at right angles to the axis of the shaft B, all as shown in Figs. 2, 4, and 7. The plates $b$, of which said field-magnet cores C are composed, may be curved in the direction of their widths to arcs of circles concentric with the axis of the shaft B, as shown, or they may be straight in the direction named and be arranged tangentially to circles concentric to said axis. There must be four or more of these magnet-cores C attached to each frame A, so that each field-magnet shall comprise a plurality of both north and south poles, the number of said poles being increased according as it is desired to decrease the speed of revolution of the motor, as when it is desired to apply the revolving part of the motor directly to a shaft that requires to be revolved at a comparatively slow speed. In the machine illustrated in the drawings there are eight cores C attached to each frame A, and each field-magnet has four north and four south poles. Each of these magnet-cores is wound with a coil $C^2$, of suitable insulated wire, held in place by the fiber insulating-plates $c c$, as shown in Figs. 2 and 4, and said coils on each frame A are connected together in series by wires $c'$, and the two series are connected together by wire $c^2$, so that a current of electricity passing from the binding-post $d$ through the commutator and along the wire $d'$ traverses all of the coils $C^2$ of one field-magnet and then all the coils of the other field-magnet in succession, and passes off through the binding-post $d^2$, as shown in the central portion of the diagram shown in Fig. 5.

The hub of the bearing $A^3$ on one of the frames A has adjustably secured thereon the segmental plate D, the hub of which is cut open on one side and provided with an ear $e$ on each side of said cut, by means of which and the screw $e'$ said plate may be clamped firmly to the bearing $A^3$, as shown in Figs. 1 and 2.

The shaft B has firmly secured thereon, just inside the bearing $A^3$, which carries the plate D, a disk E, of suitable insulating material, and at a suitable distance therefrom another disk E', of like material, said disks having in their faces that are toward each other annular grooves to receive tongues $f$, formed on the ends of the commutator-segments $g$, and the insulating-plates $g'$, placed between them, as shown in Figs. 2 and 4. The commutator-segments $g$ correspond in number to the number of armature-segments used, which in the case represented is forty. The shaft B also has secured thereon, so as to revolve therewith, the hub F, having formed in one piece therewith the disk or flange F' at one end, and secured to its other end by the nut $h$ and pins $h'$ the disk $F^2$, corresponding in size and shape to the disk F'. The inner or adjacent faces of the disks F' and $F^2$ have formed therein peripheral rabbets $h^2$ to receive the inner ends of the radially-projecting arms $h^3$, made of some strong insulating material, preferably vulcanized fiber, which are secured in position on said disks by screws $i$, as shown in Figs. 1, 2, and 3. Each of these arms $h^3$ has formed therein near its outer end a rectangular slot to receive the end of an armature-core G, composed, preferably, of a plurality of thin flat soft-iron plates fastened together by rivets and secured in position by the set-screws $j$, as shown in Figs. 1, 2, and 3. Each of these armature-cores G has wound thereon between the arms $h^3$ a coil $h^4$, of suitably-insulated wire.

In the motor illustrated in the drawings there are forty armature-magnets so arranged that their end surfaces, instead of their sides, are presented to the action of the two field-magnets between which they are placed, and revolve about the axis of the shaft B.

It is a well-known fact that in an electric motor a greater power can be obtained by the use of a great number of small magnets than from a smaller number of large magnets with the same aggregate weight or mass of metal used in each case, and also that the power capacity of an electromotor is proportioned to the number of changes of polarity which take place in a given time. In consequence of the above facts electric motors as heretofore constructed have to be run at very high speeds in order to transmit any considerable power, and as the speed of the motor is very much higher than it is desirable to run most machinery that is to be operated thereby resort is had to gearing to reduce the speed to the desired number of revolutions per minute. This in many cases is objectionable on account of the additional weight of the apparatus and the extra cost of the same. I overcome this objection by using an increased number of magnet-poles in either or both the field and armature magnets and connecting the armature in a novel way, which I will now proceed to describe.

The usual manner of connecting a series of armature-coils with each other is to join the outside end of the first coil to the inside end of the next or second coil, the outside end of the second coil to the inside end of the next or third coil, and so on around the circle to the last coil, and the outside end of the last coil to the inside end of the first coil, each of the junctions between said coils being connected by a suitable wire with a corresponding segment of the commutator, and brushes or contact-pins touch the commutator at intervals equal in angular space to the distance apart of two field-poles from each other, as many brushes or contact-pins being used as there are pole ends in the field-magnet. In my improved motor the forty armature-coils are arranged equidistant from each other in a circle concentric with the axis of the shaft B, ten in each quarter of the circle, and those in each quarter are numbered from one to ten, as shown in Figs. 3 and 5. Commencing with armature-coil No. 1 at the top of the motor, I connect the inner end of said coil by the wires $k$ with the outer end of No. 1 coil at the right side of the motor, the inner end of that coil by wire $k'$ to the outer end of coil No. 1 at the bottom, the inner end of the last-mentioned coil by wire $k^2$ to the outer end of coil No. 1 at the left side of the motor, these four coils forming a group of magnets connected together as one magnet in such a manner that whenever a current of electricity is traversing them and one is reversed all of the four will be reversed at the same instant. There are ten groups, each comprising four magnets, each magnet in a group having a like number and connected together in the same manner as group No. 1. The coil No. 1 at the left side of the motor has its inner end connected to the outer end of coil No. 2 of the right-hand upper quarter by the wire $l$, and the coil No. 2 in the left-hand upper quarter of the circle has its inner end connected by the wire $l'$ to the outer end of coil No. 3 in the right-hand upper quarter of the circle, and so on until coils 3, 4, 5, 6, 7, 8, and 9 in the left-hand upper quarter of the circle are in like manner connected, respectively, to coils 4, 5, 6, 7, 8, 9, and 10 in the right-hand upper quarter of the circle by the wires $l^2, l^3, l^4, l^5, l^6, l^7$, and $l^8$. The inner end of the coil No. 10 in the left-hand upper quarter of the circle is then connected to the outer end of coil No. 1 in the right-hand upper quarter of the circle, as shown at $m$, Fig. 5. The segments of the commutator are numbered to correspond to the numbers of the armature-magnets in four sets of ten each, as shown in Fig. 6. These segments are connected together in ten groups of four each, as follows: All of the segments numbered 1 are connected by wire $n$, those numbered 2 by wire $n'$, 3 by wire $n^2$, 4 by wire $n^3$, 5 by wire $n^4$, 6 by wire $n^5$, 7 by wire $n^6$, 8 by wire $n^7$, 9 by wire $n^8$, and 10 by wire $n^9$, as shown in Fig. 6. One-half of the segments in the upper and lower quarters of the circle are provided with binding-screws $o\ o$, said screws on one side of the commutator-cylinder being set in the segments having odd numbers, as 1, 3, 5, &c., and on the opposite side in the segments having even numbers, as 2 4 6, &c. The binding-screws in the segments 1, 2, 3, 4, 5, 6, 7, 8, 9, and 10 are respectively connected by correspondingly-numbered wires to the correspondingly-numbered armature-coils in the upper left-hand quarter of the circle of armature-magnets, as shown in Figs. 5 and 6, said wires being shown partly in full lines in said figures and partly by dotted lines connecting said figures. By this method of connecting the armature-magnets together in groups of equal number and of the same phase, and connecting the several groups together in series, and connecting the segments of the commutator together in groups, and said groups of commutator-segments to corresponding groups of armature-magnets, I am enabled to very largely increase the number of magnets, both field and armature, without increasing the number of commutator-brushes or contact-pins, only two being necessary whatever the number of the field and armature magnets, provided that the number of the armature-magnets shall be some multiple of the number of poles in the field-magnet. What is meant by magnets having the same phase is armature-magnets that at the same instant bear the same relation to a field-magnet pole—that is, are at the same distance from and on the same side of a field-magnet pole with reference to the direction of the revolution. The segmental plate D has set therein two inwardly-projecting studs $p$ and $p'$, on which are mounted, respectively, the brush-holder blocks $q$ and $q'$, provided with suitable slots to receive the commutator-brushes $r$ and $r'$, which are secured therein in their proper positions by the set-screws $r^2$ and $r^3$, respectively. The brushes are pressed into contact with the peripheral surface of the commutator-cylinder by the tension of coiled springs $s$, surrounding the studs $p$ and $p'$, one end of each of which is made fast to the adjustable collar $r^4$ on its stud and the other end to the brush-holder, one only of said springs being shown in Fig. 2. The brushes are so arranged and adjusted that their points of contact with the peripheral surface of the commutator-cylinder are at the same angular distance from each other as the pole ends of the field-magnets are apart. The frames A A are made of iron and form the yokes for the field-magnet cores.

By forming the lateral extensions C' on the field-magnet cores C and curving their active faces, as hereinbefore described, a great advantage is obtained in an increased effectiveness of the motor due to the fact that several armature-magnets are within the influence of each field-magnet pole at the same time and are being acted upon thereby with a greater or less degree of force, according to the distance between said armature-magnets and said curved surface. In the case of field-magnets not having said extensions and curved surface each armature-pole is within the influence of the field-magnet pole only for a very short space of time, and only one of the armature-poles is within the influence of said field-magnet pole at the same time.

Another important feature of my invention is making the supports of the armature-cores of vulcanized fiber or other strong insulating material, whereby a defect in the insulation of the wire of one armature-coil is prevented from affecting either of the other coils.

Another important feature of this invention is the ability to use a large number of poles in either or both the field and armature magnets with only two commutator-brushes or contact-pins, whereby a considerable saving is made in the first cost of the commutator and a great saving in time in fitting and adjusting said brushes, as well as expense in repairs caused by replacing so many brushes when they wear out, and repairing the damage done to the commutator-cylinder by the wear of a large number of brushes.

What I claim as new, and desire to secure by Letters Patent of the United States, is—

1. In a multipolar motor, the combination of a plurality of groups of equal number of armature-magnets arranged in a circle about a common center, the magnets in each group being located equidistant from each other about said circle and connected permanently together as one magnet, and the several groups being connected to each other in succession, a commutator having as many segments as there are armature-magnets and arranged in corresponding groups, the segments in each group being connected together as one, and each group of segments being connected with corresponding points of junction of the several groups of armature-magnets, and a field-magnet composed of a series of electric helices and having a plurality of both north and south pole ends, the cores and pole ends of said helices being each made up of a series of plates which extend the whole length of the core to the pole end, and having its pole end expanded laterally and curved tangentially to a plane at right angles to the axis of the revoluble portion of the motor.

2. In an electric motor, an armature having a series of magnet-cores arranged with their magnetic axes parallel to the axis of revolution of the revoluble portion of the motor, and mounted in supports made of vulcanized fiber or other suitable insulating material, whereby the several cores are insulated from each other, so that if the insulation of the wire of one coil is defective it shall not affect the other coils.

In testimony whereof I have signed my name to this specification, in the presence of two subscribing witnesses, on this 27th day of December, A. D. 1889.

WILLIAM H. CHAPMAN.

Witnesses:
N. C. LOMBARD,
WALTER E. LOMBARD.